United States Patent [19]

Beckinger et al.

[11] 3,736,563

[45] May 29, 1973

[54] PROGRAM CONTROL UNIT FOR A DIGITAL DATA PROCESSING INSTALLATION

[75] Inventors: Gunter Beckinger; Hannes Goullon, both of Munich; Gerhard Wiest, Gauting; Klaus Wehrend; Hans-Albrecht Kiessling, both of Munich, all of Germany

[73] Assignee: Siemens Aktiengesellschaft, Berlin and Munich, Germany

[22] Filed: Mar. 30, 1971

[21] Appl. No.: 129,542

[30] Foreign Application Priority Data

Mar. 31, 1970  Germany.....................P 20 15 272.1

[52] U.S. Cl..............................................340/172.5
[51] Int. Cl................................G06f 9/12, G06f 9/16
[58] Field of Search..................................340/172.5

[56] References Cited

UNITED STATES PATENTS

| | | | |
|---|---|---|---|
| 3,368,205 | 2/1968 | Hunter et al. | 340/172.5 |
| 3,315,235 | 4/1967 | Carnevale et al. | 340/172.5 |
| 3,389,376 | 6/1968 | Packard | 340/172.5 |
| 3,478,322 | 11/1969 | Evans | 340/172.5 |
| 3,585,600 | 6/1971 | Saltini | 340/172.5 |

*Primary Examiner*—Gareth D. Shaw
*Attorney*—Brich, Swindler, McKie & Beckett

[57] ABSTRACT

A program control unit for a digital data processing installation is described. The program control delivers macro-commands from a macro-command memory, and micro-commands from a micro-command memory. The micro-commands can be delivered singly or in selected combinations. In addition to the main commands in the macro-command memory which act as macro-commands for directly releasing micro-programs, there are also main commands which follow each other and indirectly cause the delivery of one or more micro-commands. Indirect delivery of micro-commands is caused in any case by a machine address of a memory cell, belonging to the pertinent main command, related to the macro-command memory for another macro-command. At least one auxiliary command which can be called up by different main commands is contained in a memory cell of this type. Each auxiliary command determines, by means of a micro-command machine address related thereto of the memory cell in the micro-command memory, the delivery of this micro-command or the delivery of this micro-command and the micro-command which follows in the micro-command memory.

11 Claims, 1 Drawing Figure

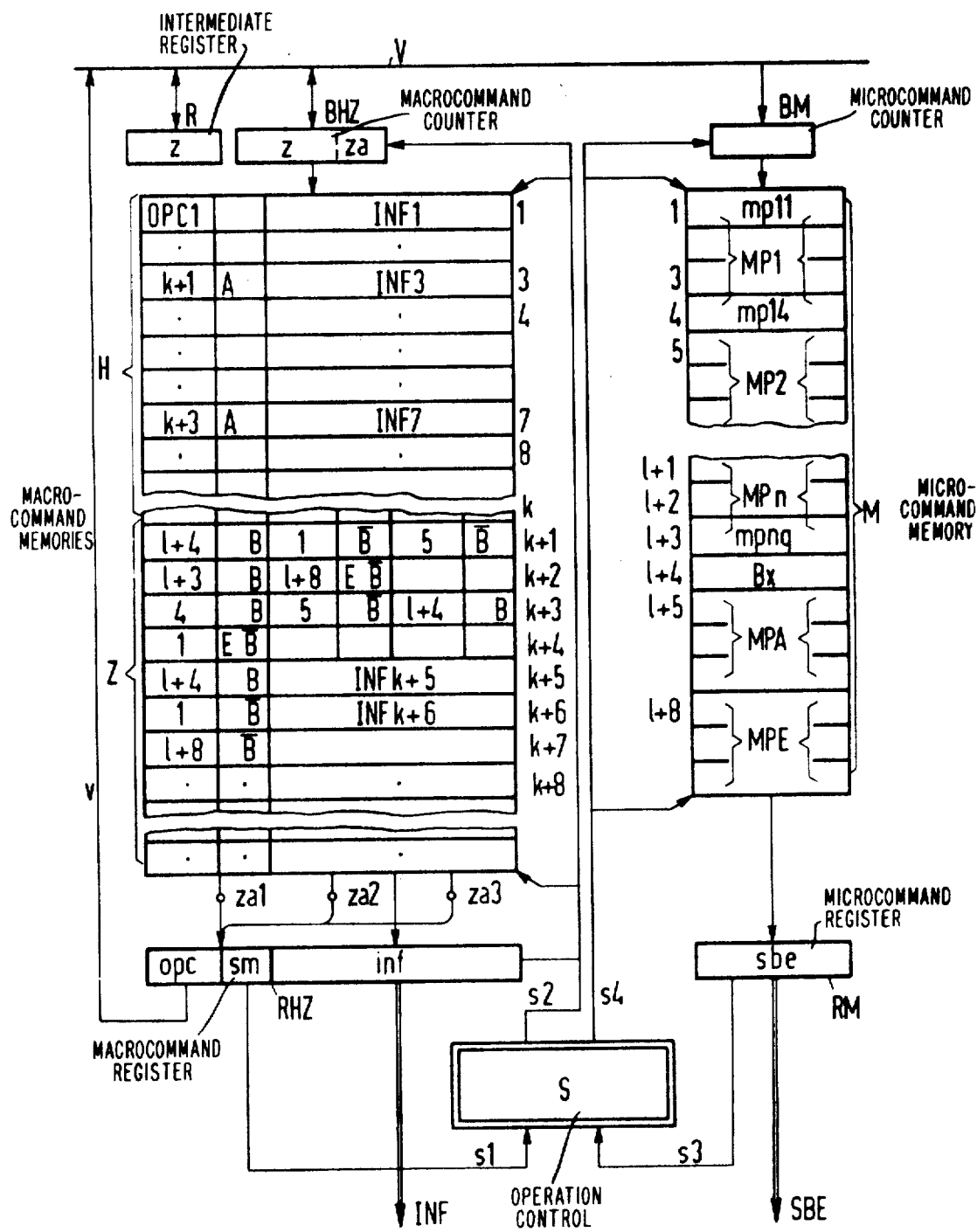

PROGRAM CONTROL UNIT FOR A DIGITAL DATA PROCESSING INSTALLATION

BACKGROUND OF THE INVENTION

As is well known in digital data processing installations two program levels or levels of control are provided; namely, one program level, in which macro-commands of a macro-program command region are provided and a program level, in which micro-commands of a micro-program command region are provided. During the execution of the program in the utilization of these program levels in a micro-command is called with the help of a macro-command which microcommand is followed by further micro-commands until the micro-program so formed is ended. During their execution the micro-commands themselves control the component units of the data processing installation which serve to process the data. Now it is also already known (see British Pat. No. 1,038,710) to call up by means of a macro-command, micro-commands other than the first micro-command of a micro-program. By this means, micro-commands belonging to micro-programs can be individually utilized when it is useful for the envisioned processing of data. While the addresses necessary for micro-commands are normally included in the part of a macro-command containing the operation code, using this mode of operation the addresses of micro-commands other than the first micro-command of a micro-program are derived from the remaining part of a macro-command which does not contain the operations code. It is also known (see U.S. Pat. No. 3,325,788) besides individual micro-commands to also select a series of micro-commands from all of the stored micro-commands. A special series control circuit is used for this purpose, which only activates at the output of certain macro-commands and which functions in place of the otherwise active series control circuit. The cited special series control circuit represents a control device completely separate from the macro-command memory, in which a counting arrangement (counter) proceeding from a preset value is switched further through a special micro-command (see U.S. Pat. No. 3,325,788). Branching control signals are also to be used in order to obtain the micro-commands in the envisioned manner. Finally, it is also known by use of an additional so-called path finder memory (path finder storage) to selectively put together and to store given series of addresses of micro-commands contained in another memory. By calling up selected ones of these series by means of macro-commands additionally formed micro-command series can then be called up. But here, in comparison with the previously described arrangement, there is present the disadvantage that a special memory with its own control devices is to be used, the avoidance of which, as the other arrangements show, is viewed as very important.

SUMMARY OF THE INVENTION

The invention now shows a way how not only an additional memory can be saved, but also how a special series control circuit can be dispensed with. It is, by using this invention, possible not only to individually call up single micro-commands from the micro-programs provided, but also to call up segments of these programs. Further, it is also possible to call up entire micro-programs in a different manner than usual. The invention also shows that different component devices of the program control unit provided can be multiply utilized. Thereby, there is also present, the advantage that the available micro-commands and micro-programs can be additionally combined with each other in various manners in order to be able to carry out many different micro-programs. These combinations are multiply utilized, whereby a saving on storage space is brought about. Further, the inventive measures for the calling up of micro-commands through macro-commands can be multiply utilized. The application of the invention does not require a program control unit which produces branching control signals. Further, it is not necessary that jumps be carried out in the micro-command region.

In contrast, the invention proceeds merely from a program control unit for a digital data processing installation which, in addition to macro-commands from a macro-command memory, also delivers micro-commands from a micro-command memory and can deliver the provided micro-commands singly or in optionally selected combinations, whereto, in the macro-command memory, in addition to main commands as macro-commands which directly release micro-programs, main commands which indirectly cause the delivery of one or more micro-commands also follow each other. This program control unit is thereby characterized that the indirect delivery of micro-commands is caused by means of a machine address, belonging to the pertinent main command, of a storage cell (memory cell), belonging to the macro-command memory, for another macro-command; that in a memory cell of this type at least one auxiliary command which can be called up by different main commands, is contained; and that each auxiliary command by means of a machine address, belonging to it (to the auxiliary command) of the memory cell, belonging to the micro-command memory, of a micro-command determines the delivery of this micro-command or the delivery of this micro-command and the micro-command which follows in the micro-command memory.

In accordance with the above statements, the inventive program control unit has the capability to be able to deliver in addition complete to micro-programs also micro-commands singly or in optionally selected combinations. In order to bring this about, an additional memory is not required, because with the help of the auxiliary commands the macro-command memory which is provided is additionally utilized herefor. This makes it possible in the indirect delivery of micro-commands to utilize therewith only command counters which are already provided which contributes to the saving of a special series control circuit. This utilization is especially convenient when the mentioned machine addresses arise in any given case, in the operation part of a macro-command.

The auxiliary commands envisioned in accordance with the invention are for, as it were, a program level which is inserted between the level for the macro-program and the level for the micro-program. Advantageously, this additional program level can be created in the inventive program control unit without the necessity of a special memory. Indeed, herefor, a certain memory space in the macro-command memory which is already provided is taken up. This memory space, is however, multiply utilized in that the auxiliary commands contained therein can be called up by different main commands. Thereby, a number of otherwise necessary main commands which would have individually released a micro-program can be saved through an auxiliary command of this type. If one takes this advantage into consideration, then it results that, over all, a reduction of the memory space in the macro-command memory is possible. All this is brought about without the programming being made more difficult. The main commands which cause the indirect delivery of micro-commands can be put into (inserted) by the programmer like, otherwise, usual macro-commands which, as is known, call up micro-program. The machine address of the first command of an auxiliary command series is found in the operation part of the main command. The information part of this main command is performed during the series of the auxiliary commands which normally have no information part themselves.

DETAILED DESCRIPTION OF A PREFERRED EMBODIMENT OF THE INVENTION

Referring to the single FIGURE of the drawings, the invention will be described by describing the construction and operation of a preferred embodiment of a program control unit for a data processor. The data processor is not shown or described in that it is not a part of the invention. Any of the numerous readily available conventional types of data processors may be used. An example of a suitable processor with which the inventive program control unit might be used is to be found in U.S. Pat. No. 3,400,371. To this program control unit belong the macro-command memory H–Z, which has the memory cells $1 \ldots k+8 \ldots$. The main commands are contained in the part H of the macro-command memory and indeed in the memory cells $1 \ldots k$. Auxiliary commands are contained in the part Z of the macro-command memory with the memory cells $k+1 \ldots k+8$. . . . The macro-command memory H–Z has the macro-command counter BHZ which delivers the machine addresses of its memory cells in order to call up macro-commands contained therein. These, thereby, arrive in the macro-command register RHZ. From there the parts of the macro-command are passed on over different outgoing lines to other devices, so that they can be processed there. The line $v$ leads to the distributor line V, to which the macro-command counter BHZ, the intermediate register R and the micro-command counter BM are connected. The line $s1$ leads to the operation control device S. In addition, the line designated with INF leads away from the command register RHZ, over which line the information part of the macro-command is passed onto those devices e.g., a central processor, which take up and process information. The previously mentioned micro-command counter BM delivers machine addresses for the memory cells $1 \ldots 1+8 \ldots$ belonging to the micro-command memory M. In this micro-command memory are contained micro-programs composed of a plurality of micro-commands, such as the micro-program MP1 having the micro- commands $mp11 \ldots mp14$ as well as micro-commands which can be called up individually, such as the micro-commands Bx. A micro-command called up in any given case, is routed to the micro-command register BM. It takes effect over lines which lead away from there. Thus, a micro-command has to activate, for example, switching points over which the processing unit devices which cooperate in the carrying out of the operation indicated by the command are connected together. These switching points are controlled over the lines designated with SBE. Also, the line $s3$ leads from the micro-command register RM to the operation control device S, so that this device can also be influenced by a micro-command. The operation control device S can, for its part, influence the manner of operation of the micro-command memory M together with the micro-command counter (BM) belonging thereto, which is indicated by the line $s4$ leading thereto. In addition, the operation control device S can also influence the manner of operation of the macro-command memory H–Z together with the macro-command counters BHZ belonging thereto, which is indicated by the line $s2$ leading thereto.

The counters, registers, and memories described hereinabove are conventional in construction, and it is contemplated that any of a number of well known prior art devices can be used for these components. For example, the above cited British Pat. No. 1,038,710 contains a detailed description of a construction of a microprogram controlled data processor, and in particular, describes suitable constructions for counters, registers, and memories which might be equally as well applied to this invention. A detailed description of a particular control unit corresponding to the operation control S described hereinabove is to be found in U.S. Pat. No. 3,325,788. This latter patent describes a servo circuit which may be employed to perform the sequential control operations required of operation control S. This U.S. patent, in addition, provides descriptions of suitable registers, counters and memories which may be used in conjunction with this invention.

As indicated above, the indirect delivery of micro-commands is caused in any given case by means of a machine address, belonging to the pertinent main command, of a memory cell, belonging to the macro-command memory H–Z, for another macro-command. Main commands of this type are found, for example, in the memory cells 3 and 7 of the part H of the macro-command memory. They are inserted between other main commands, which directly release micro-programs. A main command of this type is found, for example, in the memory cell 1. The operation code OPC1 and the information part INF1 belong to this main command. The operation code OPC1 comes in the part $opc$ of the macro-command register RHZ, when this main command is called up by means of the address 1 by the macro-command counter BHZ. This operations code arrives at the micro-command counter BM over the line $v$ and over the distributor line $V$; it there brings about the corresponding counter position whereby a micro-program is then called up in the micro-command memory M. If, for example, the memory cell 3 of the part H of the macro-command memory is called up by the macro-command counter BHZ, then instead of the operation code OPC1 the machine address $k+1$ arrives in the part $opc$ of the macro-command register RHZ. Through this machine address, it is brought about that the macro-command contained in the memory cell $k+1$ is called up by the macro-command counter BHZ.

When the machine addresses are memory cells of the macro-command memory which differ from machine address of memory cells of the micro-command memory by their code or by their size, then they can be correctly utilized in any given case without the use of special control signals (control characters). If these differences are not present, then the correct utilization can be brought about in that the machine addresses arising in the macro-command memory are supplemented in the operation part by at least one additional control character (control signal), which determines their evaluation. Herefor, a special memory cell can be provided in the memory cell utilized in any given case. This measure is envisioned or provided for in the macro-command memory H–Z. The additional control character A is contained in the special memory location in the memory cells 3 and 7, which indicates that the machine address $k+1$ in the memory cell 3 and the machine address $k+3$ in the memory cell 7 belong, in any given case, to a memory cell of the macro-command memory itself. The control character A can release still further effects, as will be described later. After the memory cell 3 of the part H of the macro-command memory has been called up, the memory cell $k+1$ of the part Z of the macro-command memory is called up. In this memory cell, there are contained three auxiliary commands. The machine address 1+4 and the control character $\bar{B}$ belong to the first auxiliary command. Firstly, it is considered alone. The machine address 1 and the control character $\bar{B}$ belong to the second auxiliary command and the machine address 5 and the control character B belong to the third auxiliary command. The meaning of the mentioned control characters will be explained hereafter. The machine addresses belonging to the auxiliary commands bring it about that each auxiliary command calls up a memory cell belonging to the micro-command memory M (and indeed, when it arrives in the macro-command register RHZ). The machine address 1+4 arrives as do the other pertinent address in the part of the macro-command register RHZ. It is routed over the line $v$ and the distributor line V to the micro-command counter BM of the micro-command memory and it causes the memory cell 1+4 to there be called up, in which memory cell 1+4 the micro-command Bx is contained. When the main command of the memory cell 7 of the part H of the macro-command memory is called up, then the machine address $k+3$ arrives in the macrocommand register RHZ and is also used because of the participation of the control character A to call up a memory cell of the macro-command memory; namely, the memory cell $k+3$, in which among other things, the auxiliary command with the machine address 4 and the control character B is found. The machine address 4 then arrives in the part *opc* of the macro-command register RHZ and causes the memory cell 4 of the micro-command memory M to be called over the micro-command counter BM, in which memory cell 4 the micro-command $mp14$ is found, which (micro-command) belongs to the micro-program MP1. In the last described manner, a single micro-command is called up with the help of an auxiliary command, which (single micro-command) belongs to a micro-program, and which will be singly (individually) carried out thereafter, because the single micro-command arrives in the micro-command register RM as a single command of this micro-program.

Through the above described processes, which serve to call up micro- commands, two micro-commands contained in the micro-command memory are delivered in a combination, which first results when auxiliary commands are utilized. In a corresponding manner, optional selected combinations of micro-commands can be delivered, insofar as auxiliary commands adapted only herefor, are provided. If the auxiliary command in the memory cell $k+3$ of the part Z of the macro-command memory had had the machine address 3 instead of the machine address 4, then the memory cell 3 of the micro-command memory would have been called up and the commands contained in the memory cells 3 and 4 of the micro-program memory M would have been called up through the participation of an appropriate control character, wherefrom it results that each auxiliary command can determine the delivery of a certain micro-command of the delivery of this micro-command and the following micro-command in the micro-command memory by means of a machine address belonging to it (to the auxiliary command). Thereby, a series of micro-commands can here form a micro-program section reaching up to the end of a micro-program or the series can also form an entire micro-program. To call up the micro-commands belonging thereto, the micro-command counter BM is to count further, preceding from the first machine address delivered to it, until the end of the pertinent micro-program is reached. This is the same manner of operation which the micro-command counter has when a micro-program is directly called up by a main command. Thus, this manner of operation results without special measures being necessary.

As mentioned above, the machine addresses which arise in the operation parts of certain main commands or of the auxiliary commands, are supplemented there, by at least one additional control character, which determines the evaluation of the machine addresses. In the following, in addition to the already described control character, A, among other things, still further control characters and their evaluations will be described in detail.

To begin with the description of the evaluation of the control character A will be supplemented, which control character supplements a machine address belonging to a main command. This control character allows the micro-program MPA to run, through which the operation of the program control unit is switched over to the utilization of auxiliary commands. The control character A operates for this purpose after it has arrived in the part sm of the macro-command register RHZ. It is there connected to the line $s1$, which leads to the operation control device S, over which it also arrives at this operation control device. The operation control device S causes the micro-command counter BM to take or assume the counter reading (counter condition, or counter position) in accordance with the machine address 1+5 and thereby to call up the first micro-command of the micro-program MPA which thereupon runs to its end, whereby the operation of the program control unit is switched over in the previously mentioned manner. It is to be noted that the machine address is delivered alone by the operation control device S and not by the macro-command memory H–Z, for the micro-program MPA can also have the value 0 in case of corresponding situations of the micro-program. In this case, no special expenditure for the delivery of this machine is required. In the course of the switch-over of the operation, different processes (operations) take place. To begin with, the erasure of the information part of a main command in the part inf of the macro-command register RHZ in case of a change of the counter reading of the macro-command counter BHZ will be blocked. Consequently, the information part INF3 which arrives in the part inf of the macrocommand register RHZ, for example, in case of calling up of the memory cell 3 of the part H of the macro-command memory will not be erased, when thereafter, the memory cell $k+1$ of the part Z of the macro-command memory is called up with the help of the macro-command counter BHZ. In case of not-switched over operation, in which macro-commands which directly release micro-programs are successively called up, this erasure is not blocked, because thereby with each macro-command another information part is fed into the part of the macro-command register RHZ. In contrast, to this operation, in case of switched over operation, the information part fed into the part inf of the macro-command register RHZ with the calling up of a main command, is to be preserved there, when one or possibly more than one auxiliary commands are thereafter called up, because the micro-commands to be carried out are first delivered after the auxiliary commands have been called up and because the mentioned information part is required in the carrying out of the microcommands. With the switch-over of the operation to the utilization of auxiliary commands, the counter reading (counter position) $z$ of the macro-command counter BHZ is further to be temporarily stored intermediately at another place, so that after the calling up of auxiliary commands, with the help of machine addresses belonging thereto, whereby the macro-command counter BHZ has to assume other counter readings, (counter positions), the program can proceed with the calling up of main commands in the envisioned sequence. The counter reading (position) $z$ of the macro-command counter BHZ is in the case of the program control unit shown in the FIGURE, transferred to the intermediate register R and intermediately stored there. Instead, it could also be termporarily stored intermediately in a special memory cell of the macro-command memory. After the counter reading $z$ of the macro-command counter BHZ has been intermediately stored, auxiliary command after auxiliary command is called up by the further counting of the macro-command counter BHZ. Hereby, in as far as special measures are not provided, memory cell after memory cell of the part Z of the macro-command memory will be called up. This takes place until an auxiliary command appears which has a machine address through which the micro-commands of the micro-program MPA are delivered, which cancels the switch-over of operation, whereby, other things, the macro-command counter BHZ is set corresponding to its intermediately stored counter reading $z$ (counter position). For example, the auxiliary command contained in the memory cell $k+7$ of the part Z of the macro-command memory has this machine address 1+8. In the previously described manner, the micro-command counter BM is set in accord with this machine address, whereby the micro-program MPE which is out in the micro-program memory M is called up and runs to its end. Through the micro-commands belonging thereto, the operation control S, among other things, is influenced, when they arrive in the micro-command register RM. The operation control device S then controls, among other things, the previously mentioned processes (operations), for example, the setting of the macro-command counter BHZ. It (operation control device) has also previously already cooperated in a corresponding manner with the running of the micro-program MPE.

In the part Z of the macro-command memory, there are memory cells, which in any given case, contain a plurality of auxiliary commands, for example, in the memory cell $k+1$, to which reference has previously been made. This has the advantage that the memory space belonging to a memory cell is completely utilized. Auxiliary commands, as they have been previously described, contain no information part, so that the memory space which otherwise would be used herefor, is available for other purposes. It is utilized, as is shown in the FIGURE for the memory cell $k+1$, for the recording of further auxiliary commands. So that these auxiliary commands are called up in the correct sequence during the further counting of the macro-command counter BHZ, the macro-command counter BHZ is to supplementally count further by one counter position for such memory cells. This supplementary counter position is also indicated in the FIGURE next to the macro-command counter BHZ, and is provided with the reference character $za$. If the macro-command counter BHZ has reached a counter reading which corresponds to the machine address $k+1$, then it next assumes two intermediate counter readings, before it takes the counter reading or position corresponding to the machine address $k+2$. These intermediate counter readings or positions are also utilized to bring the auxiliary commands belonging thereto (to the intermediate counter positions) in the part $obc$ and $sm$ of the macro-command register RHZ, which parts receive the operation part. With the help of the setting $za$ of the supplementary counter position, the switching points $za2$ and $za3$ are accordingly activated, so that, for example, the auxiliary command having the machine address one and the control character $\bar{B}$ when it is called up, correctly arrives in the parts $opc$ and $sm$ of the macro-command register RHZ, which parts are provided for the take up of the operation parts. The macro-command counter BHZ is advanced by one counter position, when it is indicated by the control character A that auxiliary commands are to be called up. The supplementary counter position, however, need not be intermediately stored in the intermediate register R, because it is not required by the macro-command counter BHZ in further counting for the calling up of main commands. The supplementary counter position can also be utilized to let a series of auxiliary commands begin in the part of the memory cells otherwise envisioned for the information part. The value of the supplementary counter position must then be contained in the operations part of the main command which releases such a series of auxiliary commands. The memory space in the part of the macro-command memory will then be fully utilized.

The machine addresses belonging to the previously mentioned auxiliary commands, are supplemented in any given case, by control characters. In addition to the control character A, the control characters B and $\bar{B}$ were also used thereby. The control character B indicates that, only one single micro-command is to be delivered. The control character $\bar{B}$ indicates that a series of micro-commands is to be delivered at the call up of the pertinent auxiliary command. Such a series of micro-commands can, as indicated above, form a program segment (program section) or an entire micro-program. The micro-command counter BM therefore counts further according to its normal manner of operation at the appearance of the control character $\bar{B}$. In contrast, at the appearance of the control character B, it is now switched further as usual. Instead, after the carrying out of the pertinent micro-command, the macro-command counter BHZ is switched further. In order to bring this about, the control characters are routed in the above described manner over the line s1 to the operation control device S, which switches over the manner of operation of the micro-command counter BM over the line s4 according to the control character. In a corresponding manner, at the appearance of the control character A, the manner of operation of the macro-command counter BHZ is switched over the line s2.

The operation control device S can also be utilized to switch over the manner of operation of a memory at the appearance of a corresponding control character. This gives rise, for example, to the previously unmentioned control character E, which is contained in the memory cells k+2 and k+4 of the part Z of the macro-command memory. Through this control character E, which supplements the machine address belonging to an auxiliary command, the blocking of the erasure of the information part INF of a main command in the part inf of the command register RHZ of the macro-command memory H-Z is lifted.

Through the fact that this special control character is provided, it is made possible that supplemented auxiliary commands can also be provided, which in addition to a machine address, and the control characters B or B̄ contain an information part. Thus, the auxiliary command of the memory cell k+5 contains the machine address 1+4, the control character B and the information part INF+5. The auxiliary command in the memory cell k+6 contains the machine address 1, the control character B̄ and the information part INF+6. Such auxiliary commands directly or indirectly follow an auxiliary command which is provided with the control character E for lifting the blocking of the erasure of the information part in the part inf of the macro-command register RHZ. The supplemented auxiliary commands in the memory cell k+5 directly follows and the auxiliary command in the memory cell k+6 indirectly follows another auxiliary command which exhibits the control feature E; namely, the auxiliary command in the memory cell k+4. More memory space is required for a supplemented auxiliary command than for a usual auxiliary command, so that only one single supplemented auxiliary command is contained in a memory cell. The control character E, which achieves the lifting of the blocking of the erasure of the information part in the part inf of the macro-command register RHZ, must, if the occassion arises, therefore, also, achieve that in the macro-command counter during further counting only the counter readings (positions) which hold the memory cells themselves are used, thus, that the mentioned supplementary counter position is not used. With the help of the above described supplementary auxiliary command, it is brought about that at their (auxiliary command's) calling up information parts individually assigned to them can be utilized, which (information parts) are functional at the calling up of assigned micro-commands. It has previously been pointed out that an auxiliary command can be called up, in any given case, with the help of different main commands, the machine address of the auxiliary command to be called up must be contained in the main command with which it belongs. If a supplemented auxiliary command is utilized in this manner, then information parts can be taken into consideration thereby, which supplement in a certain manner the information part belonging to the main command; namely, of the type that, for example, the supplemented auxiliary command follows an unsupplemented auxiliary command, with which the information part belonging to the main command has already been taken into consideration. With the help of the auxiliary commands and the supplemented auxiliary command, there, therefore, results an exceptional flexibility in programming which can be utilized for the solution of different problems.

Now for a better overview of how the individual operations develop during the running of a program, such program operations will be briefly described in conjunction with the drawing. Through the macro-command counter BHZ, the memory cells 1 . . . k, in which main commands are found, are successively called up. Therebetween, is inserted the calling up of memory cells of the part Z of the macro-command memory. After the macro-command counter has called up the memory cell 3, the memory cell k+1 is called up in accordance with the machine address k+1 which is found in the memory cell 3.

Beforehand, the control character A takes effect, which is found in the memory cell 3. It causes, that with the help of the operation control device S the operation of the macro-command memory H-Z is switched over in the previously described manner from the calling up of memory cells having main commands to the calling up of memory cells having auxiliary commands, and indeed, this is accomplished in that the micro-program MPA is called up and executed. At the calling up of the memory cell k+1, the auxiliary command having the machine address 1+4 and the control character B takes effect. This has, as a result, that the single micro-command from the memory cell 1+4 in the micro-command memory M; namely, the micro-command Bx, is called up. Thereafter, the auxiliary command with the machine word 1 and the control character B̄ in the memory cell k+1 is called up. This has, as a result, that the micro-program MP1 beginning in the memory cell 1 of the micro-command memory M is called up and, indeed, this takes place up to its last program step mp14. Thereafter, the auxiliary command with the machine address 5 and the control character B̄ in the memory cell k+1 is called up. This has as a result that in the micro-program memory M the micro-program MP2, which begins at the memory cell 5, is completely called up. Thereafter, in the memory cell k+2, the first auxiliary command; namely, the command having the machine address 1+3 and the control character B, is called up. This has, as a result, that the last micro-command mpnq of the micro-program MPn which is found in the memory cell 1 +3 of the micro-program memory M is individually called up. Thereafter, in the memory cell k+2, the second auxiliary commands which has the machine address 1+8 and the control characters E and B̄, is called up. The machine address 1+8 causes, that the micro-program MPE beginning at the memory cell 1+8 in the micro-program memory, is called up, which micro-program reverses again the switch-over of operation caused previously by the control characters A of the memory cell 3 and by the micro-program MPA. The control character B̄ of the auxiliary command in question, determines that a series of micro-commands will be executed, the control character E of this auxiliary command determines, that the blocking of the erasure of the information part in the part inf of the macro-command register RHZ is lifted again. Because of the reversal of the switch-over of operation, the memory cell 4 of the part H of the macro-command memory will now be called up by the macro-command counter BHZ. The macro-command counter BHZ then counts further, until it calls up the memory cell 7. There the control character A is present, which with the cooperation of the operation control device S causes that the micro-program MPA runs, whereby, the operation is switched over to the calling up of auxiliary commands. In accordance with the machine address $k+3$ in the memory cell 7, the auxiliary commands which are found in this memory cell are successively called up similar to the way it has previously been described and, thereafter, the auxiliary command in the memory cell $k+4$ is called up. This auxiliary command has the machine address 1 and the control characters E and $\bar{B}$. Therefore, the micro-program MP1 is executed and the blocking of the erasure of the information part in the part of the command register RHZ will be lifted after execution of this micro-program. Further, with the help of the operation control S, it will be brought about that the micro-command counter BHZ counts further (continues to count) without its counter position $za$ which supplements the counter. Therefore, subsequently, the supplemented auxiliary command which is found in the memory cell $k+5$ will be called up. It arrives in the macro-command register RHZ, and indeed, including its information part INF$k+5$. Based on the machine address 1+4 and the control character B, the micro-command BX is called up and carried out. Thereafter, the memory cell $k+6$ is called up, in which, likewise, a supplemented auxiliary command is found, through which the micro-program MP1 is called up, during the execution of which micro-program the information part INF$k+6$ is taken into consideration. Thereafter, the memory cell $k+7$ is called up by the macro-command counter BHZ, in which memory cell the auxiliary command having the machine address 1+8 and the control character $rB$ is found. In the previously described manner, the micro-program MPE is thereupon executed and the operation for the macro-command memory is again switched over to the calling up of main commands. This, has as a result, that subsequently, the main command which is found in the memory cell 8 is called up.

In the FIGURE, it is shown with reference to examples, how macro-commands and micro-commands can follow each other. In the part Z of the macro-command memory, auxiliary commands and supplementary auxiliary commands can follow each other in different combinations and can, in any given case, as was previously indicated, be multiply utilized by different main commands, whereby, there results many different combination possibilities. Thereby, the provisions for jumps within the part H of the macro-command memory or in the micro-command memory M are not required. If such provisions are present, then they can be utilized in conjunction with the envisioned different programs for the arrangement of commands. Thus, even jumps between auxiliary commands can be envisioned in which series of auxiliary commands are utilized as subprograms. Hereby, the information parts of commands can also be utilized for jump addresses.

In every case, through the utilization of selected combinations of micro-commands or of series of micro-commands, which also include only parts of a microprogram, longer micro-programs can be put together through combinations of such micro-commands and micro-command series. Such longer micro-programs, therefore, need not be contained in the micro-program memory in a continuous arrangement of the micro-commands belonging thereto. The multiple utilization of the cited parts of micro-programs also, therefore, makes possible that memory space is conserved in the micro-program memory. In border line cases, all required micro-programs can be put together from micro-program segments or even from single micro-commands.

We claim:

1. In a program control unit for a digital data processing installation having a macro-command memory and a micro-command memory and which delivers, in addition to macro-commands from the macro-command memory, micro-commands from the micro-command memory and can thereby deliver micro-commands singly or in a preselected combination and having in addition to main commands in the macro-command memory which act as macro-commands for directly releasing micro-programs, main commands which follow each other and indirectly cause the delivery of at least one micro-command, the improvement comprising:

means responsive to a macro-command machine address for a main command in a memory cell in said macro-command memory for causing indirect delivery of micro-commands, said memory cell containing at least one auxiliary command which is accessible by different main commands and means utilizing a micro-command machine address of a memory cell in said micro-command memory for causing said auxiliary command to determine one of the delivery of a predetermined micro-command or the delivery of said micro-command and following micro-commands in said micro-command memory.

2. The program control unit defined in claim 1 wherein said macro-command memory is arranged such that said auxiliary commands have no information portions.

3. The program control unit defined in claim 1 further comprising:

means for forming a series of micro-commands into one of a complete micro-program and a micro-program segment extending to the end of a micro-program.

4. The program control unit defined in claim 1 further comprising:

macro-command counter means in said macro-command memory and micro-command counter means in said micro-command memory.

5. The program control unit defined in claim 4 wherein said memories are arranged such that machine addresses occur in the operation portion of a macro-command and the information portions thereof are utilized in a conventional micro-program call-up and further comprising:

at least one control character in said machine addresses and special memory locations in said memory cells for said additional characters.

6. The program control unit defined in claim 5 wherein said additional character in said machine address causes the operation of a micro-program, switching same to utilization of said auxiliary commands without using an address in said macro-command memory and further comprising:
- a macro-command register in said macro-command memory for registering main commands,
- means for blocking erasure of the information portion of a main command in said macro-command register during changes in the reading of said macro-command counter, whereby the latter information portion is effective during the following access of auxiliary commands similar to the information portions of auxiliary commands,
- means for temporarily storing the reading of said macro-command counter,
- means transferring the machine address for the main command to said macro-command counter for calling up an auxiliary command,
- said macro-command counter being operative to call up successive auxiliary commands during successive counting operations, said successive call-ups occurring until an auxiliary command appears which has a machine address through which micro-commands of a micro-program are delivered and
- means responsive to said micro-commands for reversing said counting operation to set said macro-command counter to the reading in said temporary storage means.

7. The program control unit defined in claim 6 further comprising:
- a plurality of memory cells in said macro-command memory for storing each of a plurality of auxiliary commands, said memory cells being successively accessed by the counting operations of said macro-command counter.

8. The program control unit defined in claim 6 wherein the machine address for an auxiliary command is supplemented by a control character indicative of whether one or a series of micro-commands is to be delivered.

9. The program control unit defined in claim 8 further comprising:
- means responsive to the appearance of the one of said supplemental control characters indicative of a single micro-command for blocking further counting operations of said micro-command counter.

10. The program control unit defined in claim 9 further comprising:
- operation control means which responds to control characters to control the operations of said memories and said counters.

11. The program control unit defined in claim 6 further comprising:
- means for ending the blocking of the erasure of the information portion of the main command in the macro-command register responsive to a supplemental character in said auxiliary command.

* * * * *